(12) United States Patent
Murray et al.

(10) Patent No.: US 12,064,065 B2
(45) Date of Patent: Aug. 20, 2024

(54) PREFABRICATED SHOWER PAN

(71) Applicant: Mshower, LLC, LaGrange, GA (US)

(72) Inventors: Richard Scott Murray, LaGrange, GA (US); Guihan Li, Guangdong (CN)

(73) Assignee: Mshower, LLC, LaGrange, GA (US)

( * ) Notice: Subject to any disclaimer, the term of this patent is extended or adjusted under 35 U.S.C. 154(b) by 0 days.

(21) Appl. No.: 17/592,136

(22) Filed: Feb. 3, 2022

(65) Prior Publication Data

US 2023/0240479 A1 Aug. 3, 2023

(51) Int. Cl.
*A47K 3/40* (2006.01)

(52) U.S. Cl.
CPC ...................... *A47K 3/40* (2013.01)

(58) Field of Classification Search
CPC ....................................... A47K 3/40
See application file for complete search history.

(56) References Cited

U.S. PATENT DOCUMENTS

| | | |
|---|---|---|
| 6,643,863 B1 | 11/2003 | Gerber |
| 8,209,795 B2 | 7/2012 | Cook |
| 9,332,883 B1 | 5/2016 | Angelella |
| 9,771,713 B2 | 9/2017 | Dejesus et al. |
| 9,883,777 B2 | 2/2018 | Smith et al. |
| 10,881,254 B1 | 1/2021 | Katwyk |
| 2002/0066140 A1* | 6/2002 | Gerloff ................. A47K 3/405 4/613 |

FOREIGN PATENT DOCUMENTS

| | | | | |
|---|---|---|---|---|
| DE | 202012100725 U1 * | 5/2013 | .......... | A47K 3/1605 |
| EP | 2227997 A1 * | 9/2010 | .......... | A47K 3/1605 |
| FR | 2800261 A1 * | 5/2001 | .............. | A47K 3/40 |

* cited by examiner

*Primary Examiner* — Janie M Loeppke
(74) *Attorney, Agent, or Firm* — NKL Law; Allen Xue (57) ABSTRACT

A prefabricated shower pan for installation on an installation site having a waste outlet hole includes a drain hole configured to communicate with the waste outlet hole of the installation site via a drain assembly, a shower pan floor having a slated surface towards the drain hole, at least one side wall surrounding and supporting at least a portion of the circumference of the shower pan floor, and an accommodation space disposed below the drain hole and configured to accommodate the drain assembly for connecting the drain hole in the shower pan floor and the waste outlet hole at the installation site, and the accommodation space extends to the at least one side wall, and an optional side wall opening is disposed at the at least one side wall.

13 Claims, 8 Drawing Sheets

PREFABRICATED SHOWER PAN

FIELD OF INVENTION

The present disclosure relates to a prefabricated modular shower pan having an accommodation space to facilitate connection between a drain hole in the shower pan to a waste outlet hole on the installation site, and a shower pan installation kit including the shower pan.

BACKGROUND

Replacing bathtubs with showers has recently become a very common practice in renovation projects for hotels, multifamily apartments, and single-family residences. The bathtub assembly is typically replaced with a one-piece fiberglass, acrylic, cast polymer (or cast iron) shower pan/tray. These shower pans have a fixed waste fitting location that is integral to the pan and located on the very bottom of the unit. In this case, it requires a separate drain assembly to perfectly line up with the waste outlet plumbing.

A problem with such renovation is that the existing drain locations under the tub are often unknown or are fixed in the subfloor, making location modifications time consuming and costly. Tub waste outlets are often not directly under the tub, but at a right angle towards the wall. If the subfloor is wood, and there are no conflicts with support beams the movement of existing plumbing to fit the new shower pan may be relatively simple. However, the existing plumbing is often routed through subfloor concrete, through plumbing sleeves, through joists or concrete, or in the case of side outlet tubs, may not exist under the tub at all. Making modifications to any of these scenarios could double the cost of a renovation.

For project owners and developers, low cost and ease of installation are key factors in deciding on a system to use in their projects. Existing new and replacement shower installations are labor and time intensive, requiring the inconvenience of cutting and measuring materials on site, coordinating between multiple workers in different trade areas, and time for adhesives and cement to dry.

Accordingly, there is a need for a prefabricated shower pan which reduces on site installation time, complexity, and the number of necessary adjustments for installation completion. While a typical shower pan would require at least some plumbing modifications unless in an ideal situation, the shower pan of the present disclosure works in most conditions without such plumbing modifications.

SUMMARY OF THE INVENTION

In one embodiment of the present disclosure, a prefabricated shower pan for installation on an installation site having a waste outlet hole includes a drain hole in the shower pan floor and configured to communicate with the waste outlet hole at the installation site via a drain assembly. The shower pan floor has a slanted surface. The drain hole is usually disposed at a lower point of the shower pan floor. The shower pan also has at least one side wall surrounding and supporting a circumference of the shower pan floor. An accommodation space is disposed below the drain hole and is defined by the shower pan floor and at least one side wall of the shower pan. When the shower pan is placed on the subfloor at the installation side, the accommodation space is enclosed by the shower pan floor, the subfloor at the installation site, and at least one side wall. The accommodation space is configured to accommodate the drain assembly for connecting the drain hole and the waste outlet hole.

In another embodiment, the shower pan further includes a plurality of support structures disposed underneath the shower pan floor and support the shower pan floor.

In another embodiment, the accommodation space is defined between the support structure, the shower pan floor, and the at least one side wall.

In a further embodiment, the at least one side wall has a height of at least 6 inches, the drain hole has a height of at least 3 inches, and the accommodation space has a width and a height of at least 7 and 3 inches, respectively.

In still an embodiment, a ratio of a width of the shower pan and the width of the accommodation space is 4:1.

In yet another embodiment, the shower pan further includes a second accommodation space disposed below a second portion of the shower pan floor and configured to accommodate a second drain assembly, a pipe pathway configured to accommodate a pipe extending from the accommodation space to the second accommodation space, and a second side wall opening communicating with the second accommodation space and the waste outlet hole.

In yet another embodiment, the shower pan floor includes a water receiving step defining a water receiving area disposed around the drain hole, the water receiving area configured to receive water from the shower pan floor, and a height of the water receiving area is lower than a height of the shower pan floor and the water receiving area has a slanted surface towards the drain hole.

In another embodiment, the height of the at least one side wall is greater than the height of the shower pan floor, and the height of the water receiving area is higher than a height of the drain hole.

In yet another embodiment, a shower pan installation kit includes the shower pan described above and a shower pan drain assembly.

In another embodiment, the shower pan drain assembly is one selected from among a straight drain, an offset drain, or a side/elbow outlet drain.

DETAILED DESCRIPTION

Hereinafter, embodiments of the present disclosure will be described with reference to the attached drawings. While reference numerals are given to components of each drawing, it should be noted that although shown in different drawings, like components will be referred to as like reference numerals if possible. Also, in a description of the embodiments of the present disclosure, a detailed description of well-known components or functions of the related art will be omitted when it is deemed to obscure understanding of the embodiments of the present disclosure. Also, although the embodiments of the present disclosure will be described below, the technical concept of the present disclosure is not limited or restricted thereto and a variety of modifications thereof may be made by one of ordinary skill in the art. Meanwhile, vertical and lateral directions which will be described below are on the basis of the drawings for convenience, and the scope of the present disclosure is not limited to the corresponding directions.

Throughout the specification, when a first part is stated as being "connected" to a second part, the first part and the second part may be directly connected within nothing in between, or they may be indirectly connected through other components/parts between them. Throughout the specification, when a portion is stated as "including" a component, unless defined otherwise, it means that the portion may not exclude another component but may further include another component. Also, in describing components of the embodiments of the present disclosure, the terms such as first, second, A, B, (a), (b), and the like may be used. These terms are merely for distinguishing one element from another, and the essential, order, sequence, and the like of corresponding elements are not limited by the terms.

The shower pan of the present disclosure may be prefabricated according to desired dimensions and delivered to the installation site. The shape, size, orientation, material, etc., may be customized and adjusted according to the desires of the installer and the requirements of the installation site, which may vary. The shower pan of the present disclosure is preferably manufactured as one modular unit, thus having improved structural integrity.

Figure 1:
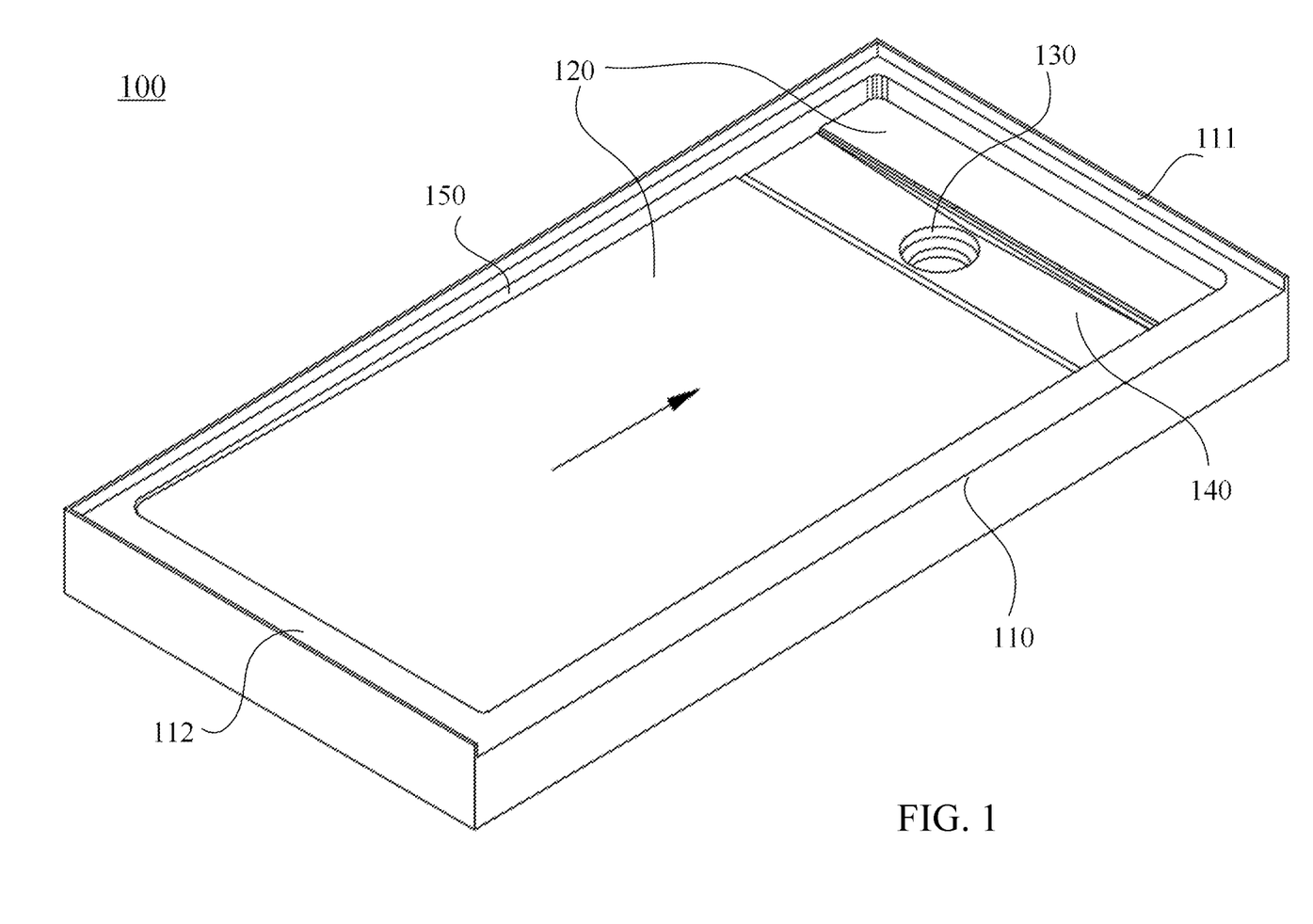
FIG. 1 shows a top isometric view of a prefabricated shower pan according to an embodiment of the present disclosure.
Figure 2:
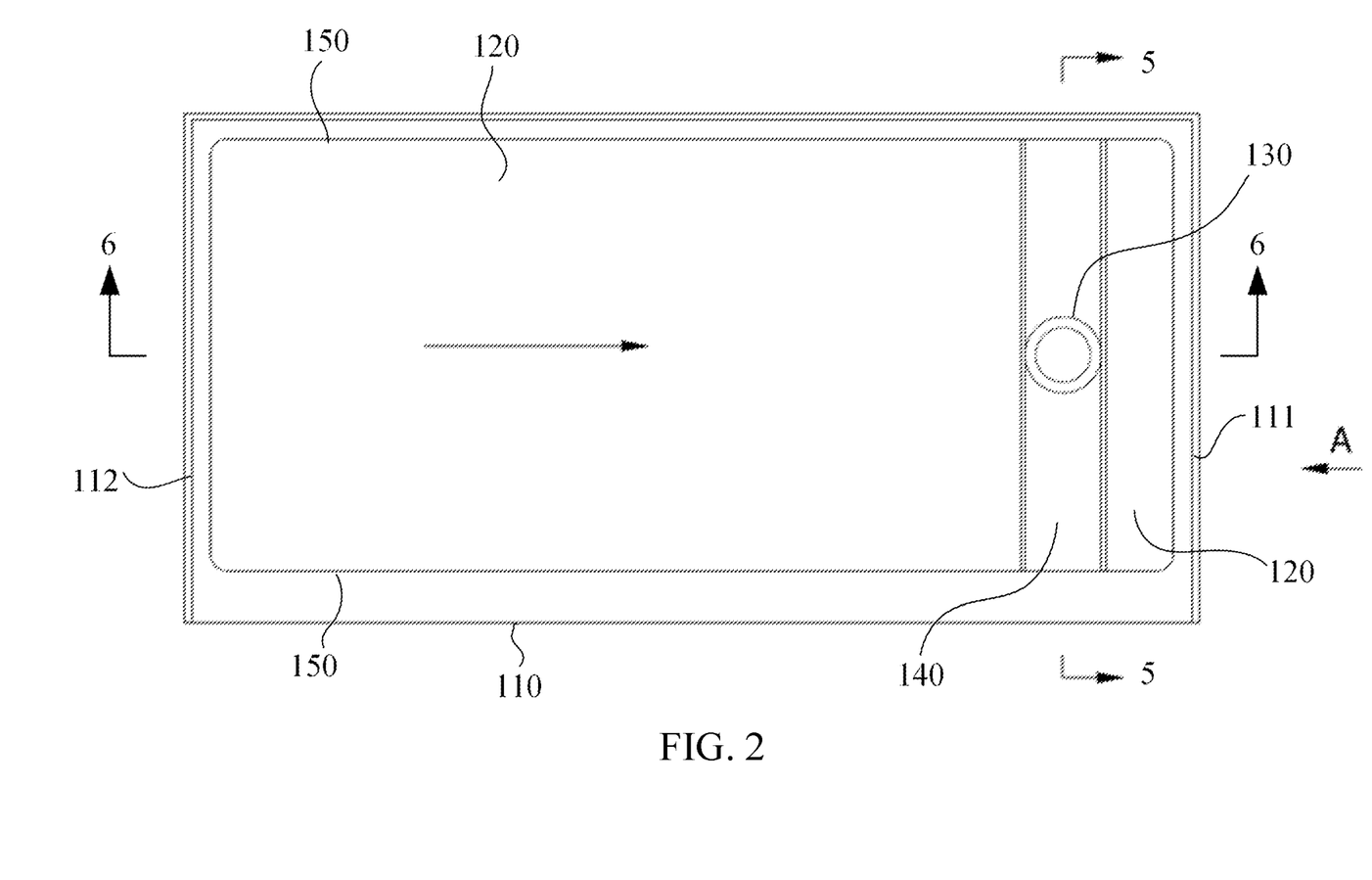
FIG. 2 illustrates a top plan view of the shower pan of FIG. 1.

Referring now to FIGS. 1-2, a shower pan 100 according to an embodiment of the present disclosure has a rectangular shape having four outer side walls on the perimeter of the shower pan 100. At one of the four side walls, an entering threshold 110 is provided through which a user may step into the shower pan, the entering threshold 110 having a lower height than that of the other three outer side walls. The shower pan 100 further includes a front end 111, a drain hole 130, and a rear end 112. The outer side walls of the shower pan 100 may be abutted against or configured to install thereabove shower enclosure walls or panels (not shown).

As mentioned above, the dimension and the shape of the shower pan 100 may vary. In general, a rectangular shower pan 100 may have width and length of 26-48 inches and 48-72 inches, respectively, but preferably around 30×60 inches, which is a standard size for a bathtub. The entering threshold 110 should have a height which is sufficient to provide a slope for the floor 120 to facilitate drainage and to provide an accommodation space 180 (discussed below), but not too high so as to inconvenience the user entering into and exiting from the shower pan. The height of the entering threshold 110 may be, when measuring from the installation floor, 3 to 10 inches, preferably 6-6.5 inches, and more preferably 5.25 inches. The height of the other sides of the shower pan may be 6 to 6.5 inches, and more preferably 6.25 inches when measuring from the installation floor.

While the embodiment of the shower pan shown in FIG. 1 is rectangular, the present disclosure is not limited to rectangular shape. Rather, aspects of the present disclosure discussed herein may be applied to shower pans of differing shapes, such as circular, oval, or polygonal shower pans as required by the available space at the installation site.

The shower pan 100 further includes a sloped floor 120 which has a gradually decreasing slope, i.e., a slanted upper surface, towards the direction of the drain hole 130. The slope of the floor 120 may vary. For example, it may decrease about 1 inch for every 4 feet of floor surface length (about 1 degree slope) to direct the shower water from the shower floor 120 to the drain hole 130.

Figure 9:
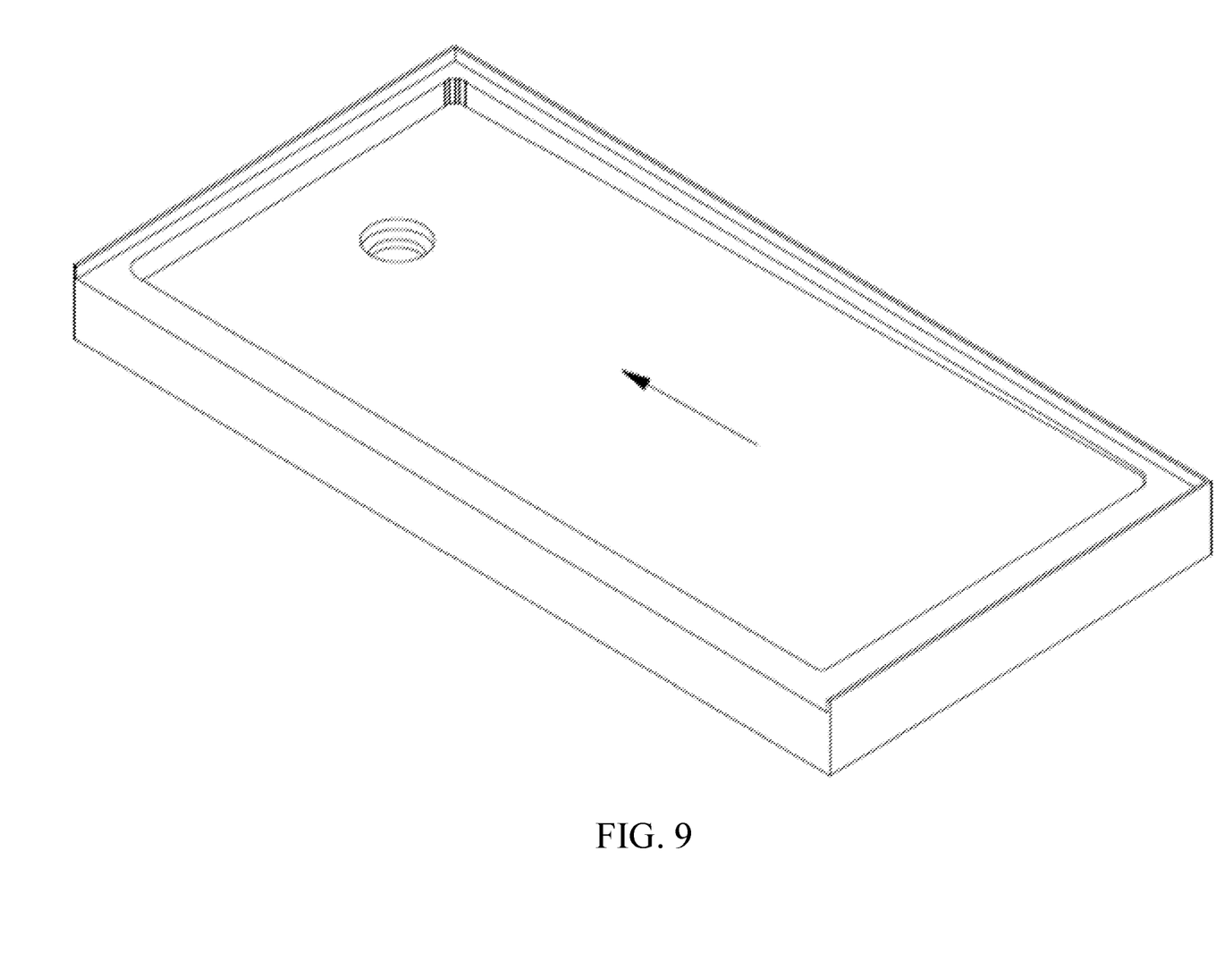
FIG. 9 shows a top isometric view of a prefabricated shower pan according to another embodiment of the present disclosure.

In the embodiment shown in FIG. 1, the shower pan floor 120 includes a water receiving step which is disposed near the drain hole 130. The water receiving step defines a water receiving area 140 of the shower pan floor 120, the water receiving area 140 having a lesser height than the floor 120 so as to receive the shower water and direct it to the drain hole 130. The water receiving area 140 may also be slanted towards the drain hole 130 to further facilitate water drainage from the shower pan 100. However, as shown in the embodiment depicted in FIG. 9, the shower pan 100 may exclude the water receiving step.

The sloped floor 120 is surrounded by inner side walls 150, which prevent shower water from overflowing out of the shower pan 100. Due to the downward slope of the floor 120 towards the front end 111, the inner side walls 150 have a gradually increasing height towards the water receiving area 140.

The drain hole 130 extends through the shower pan floor 120, and may have a circular shape with a diameter of 3-5 inches. The drain hole 130 may include an inner threaded surface to facilitate coupling with a drain assembly (not shown), and the shower water travels out of the shower pan and into the waste outlet hole (not shown) of the installation site via the drain hole 130.

Figure 3:
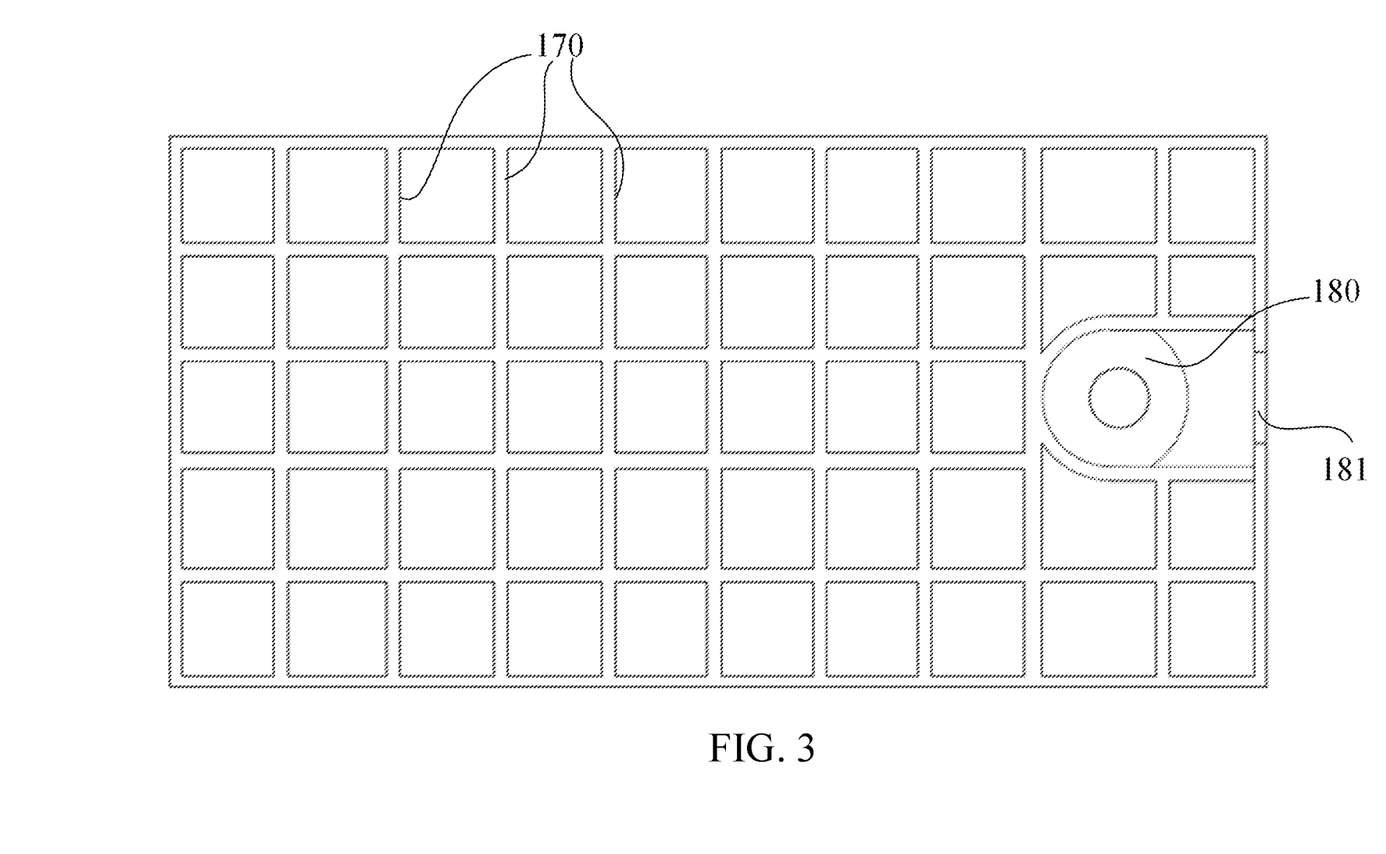
FIG. 3 shows a bottom plan view of the shower pan of FIG. 1.
Figure 4:
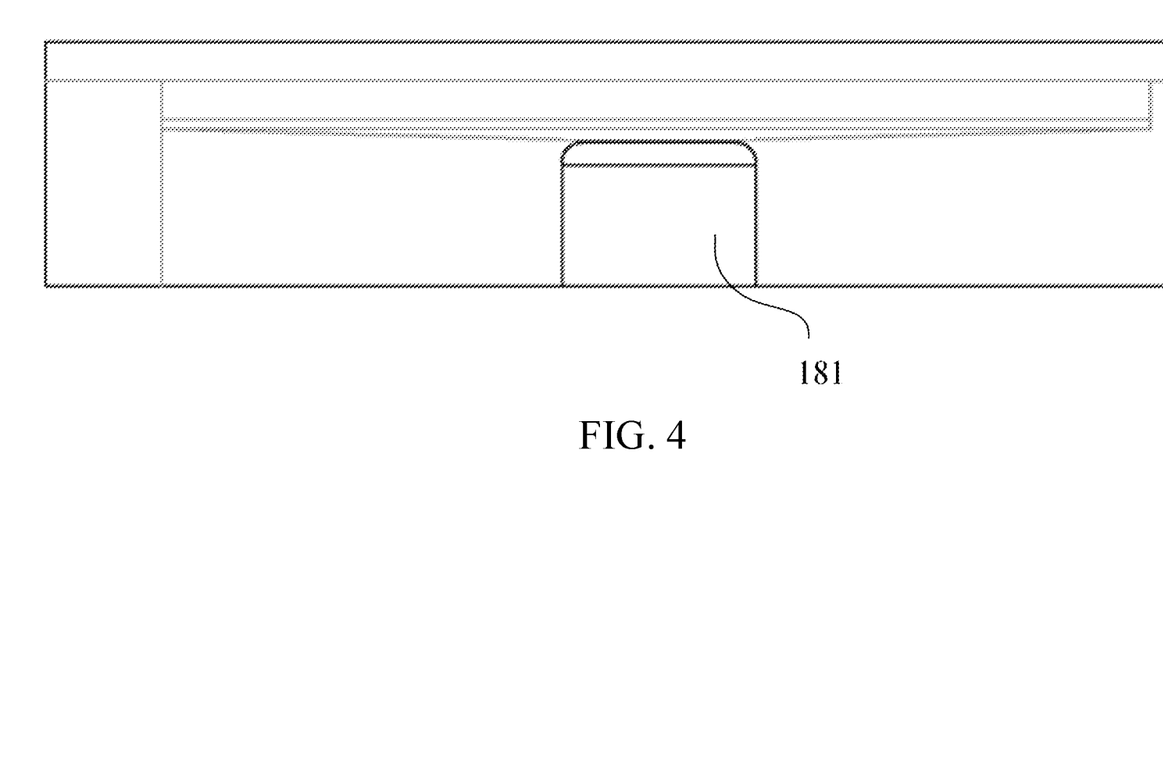
FIG. 4 shows a side elevation view of the shower pan of FIG. 1 viewed from the direction "A" of FIG. 2.
Figure 5:
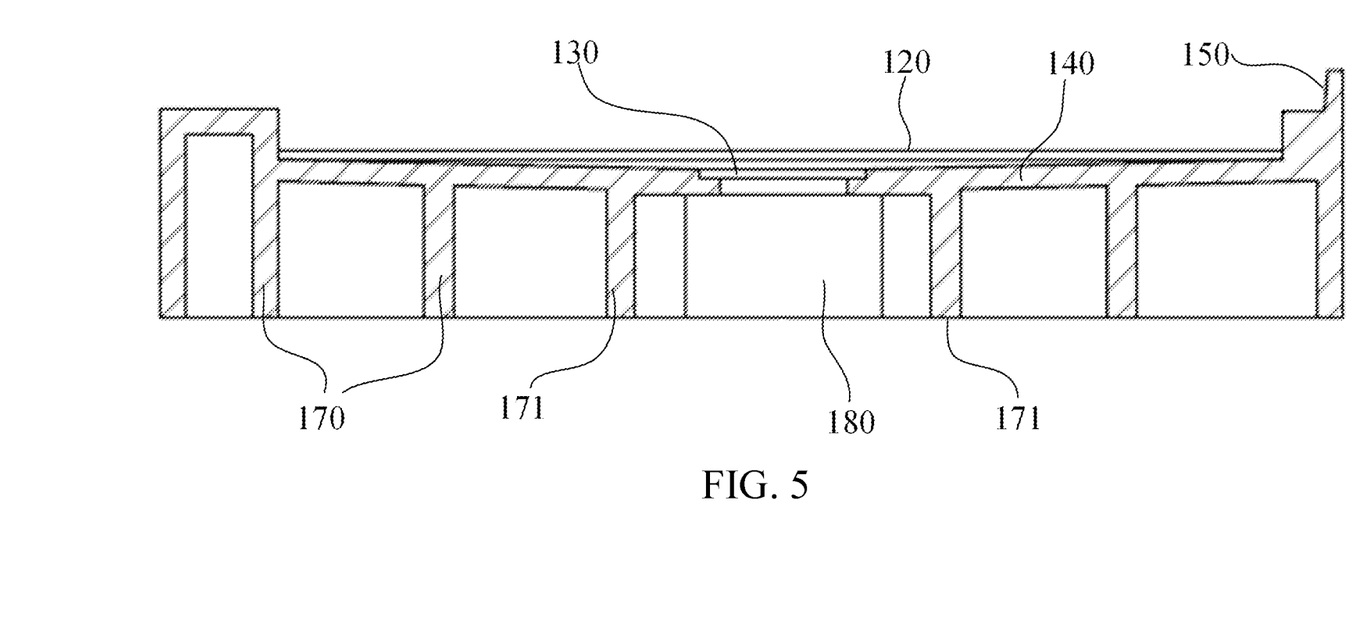
FIG. 5 shows a cross-section view of the shower pan taken along line 5-5 of FIG. 2.

FIGS. 3 and 4 show a bottom plan view and a front side elevation view of the shower pan of FIG. 1, respectively. Underneath the shower pan floor 120, there is provided a plurality of support structures 170 which form a network or a grid of interconnected supports to securely support the shower pan floor 120. In FIG. 3, the plurality of support structures 170 are shown as forming a grid of rectangular supports connected to each other and to the side walls, but the present disclosure is not limited thereto, and the supports may have varying numbers, shapes, and orientation. However, it is preferred that the entire shower pan including the support structures 170 is manufactured as one unit using a mold such that the modular shower pan unit provides improved structural integrity.

Figure 6:
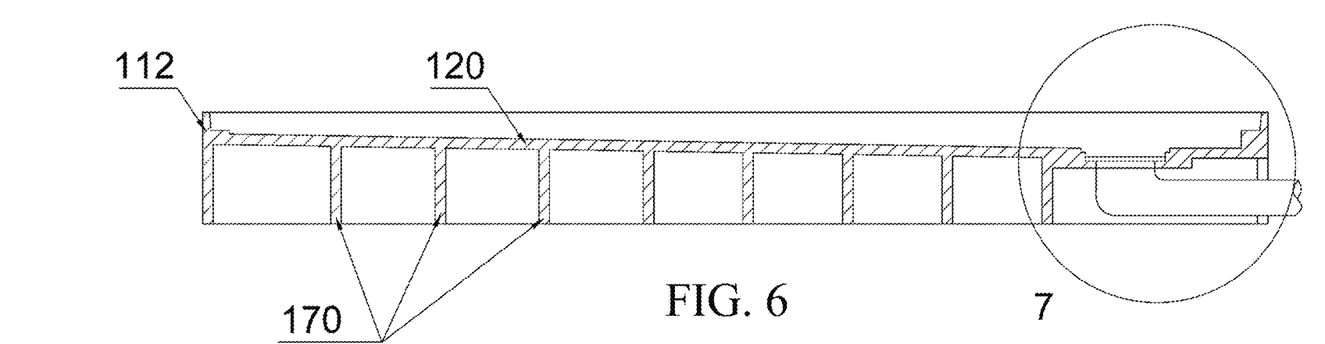
FIG. 6 shows another cross-section view of the shower pan taken along line 6-6 of FIG. 2.
Figure 7:
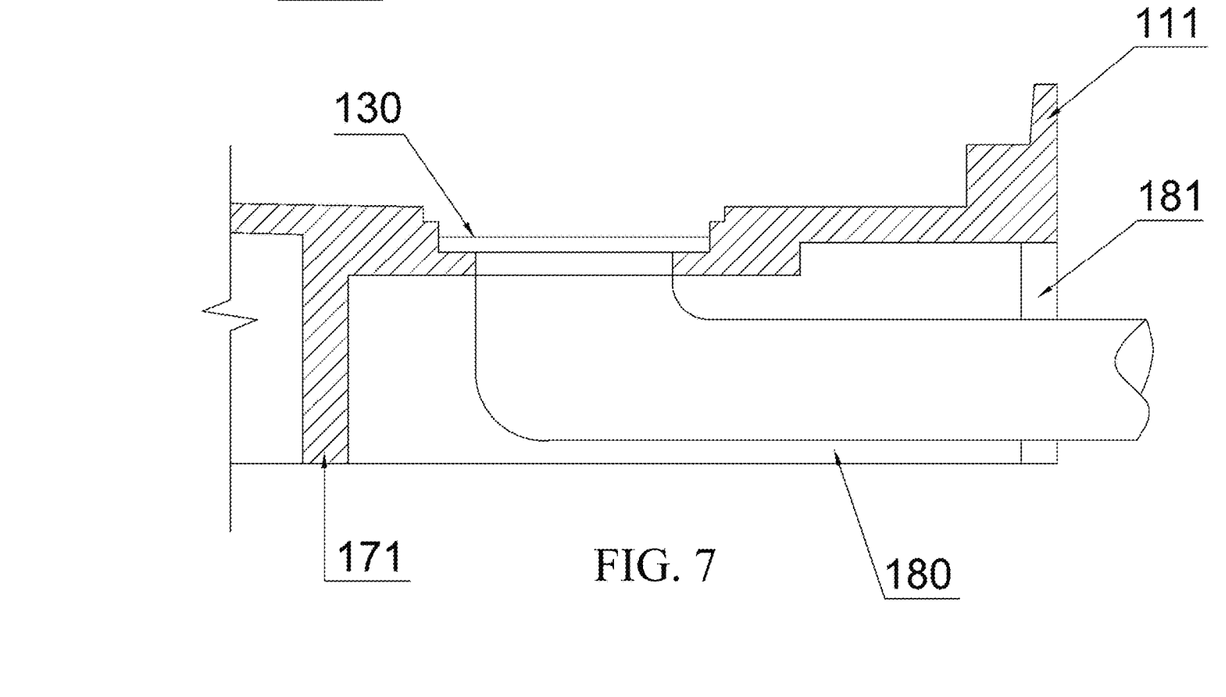
FIG. 7 shows an enlarged view of portion 7 of FIG. 6.
Figure 8:
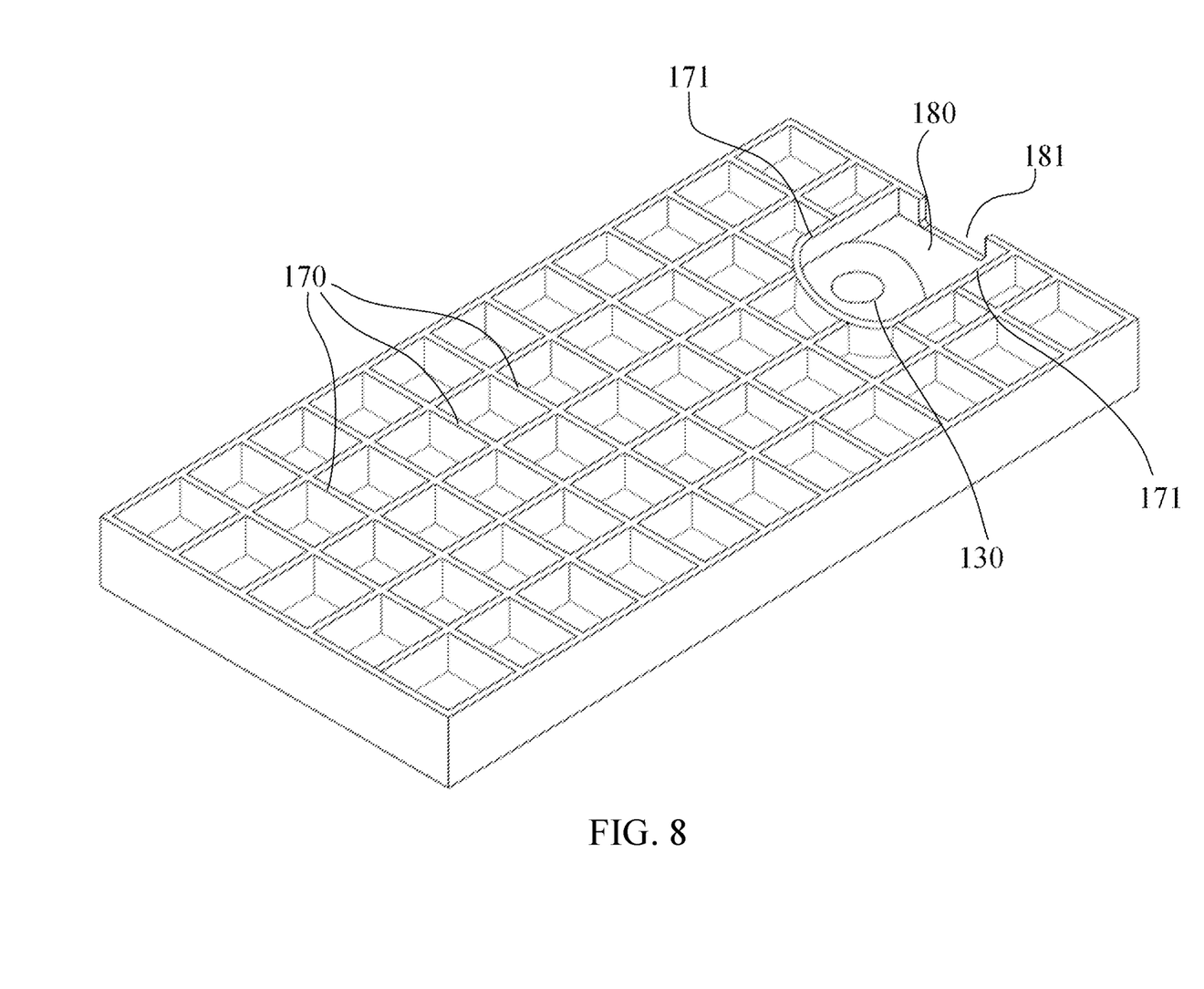
FIG. 8 shows a bottom isometric view of the shower pan of FIG. 1.

As shown in FIG. 6, the height of the plurality of support structures may vary depending on their respective position with reference to the floor 120. The support structures 170 disposed towards the rear end 112 have greater height than the support structures 170 disposed towards the front end 111. The height of the support structures 170, when measured from the installation subfloor, is the height of the floor 120 minus the thickness of the floor 120.

Referring now to FIGS. 3-8, the shower pan 100 includes an accommodation space 180 disposed below the drain hole 130 and extending towards the front end 111. The accommodation space 180 is configured to accommodate underneath the drain hole 130 a drain assembly (e.g., a side/elbow outlet drain in FIGS. 6 and 7), which connects the drain hole 130 and a waste outlet hole (not shown) of the installation site. The accommodation space 180 is defined by surrounding support structures 171 and a front end wall of the shower pan 100, which form the walls of the accommodation space 180. The shower pan floor 120 and/or the water receiving area 140 define the upper ceiling of the accommodation space 180.

The size of the accommodation space 180 may vary according to the drain assembly it is designed to accommodate. For example, it may have a width of at least 7 inches when viewed from the bottom or a circumference of at least 7 inches when measured from the center of the drain hole 130, and the accommodation space 180 extends to the front end 111. In particular, the width of the accommodation space 180 measured between the surrounding support structures 171 is preferably at least 7 inches, and more preferably 7.5 inches, and the width of the accommodation space 180 is about one fourth of the width of the shower pan 100.

Optionally, a front end opening 181 is provided at the front end wall of the shower pan 100, and the front end opening 181 communicates with the accommodation space 180 and may also communicate with a waste outlet hole that is not disposed underneath the shower pan. The front end opening 181 may accommodate a connecting member of the drain assembly to pass through the opening to connect to the waste outlet hole.

Due to the extra space made available by the accommodation space 180, the shower pan 100 of the present disclosure can be flexibly applied to installation sites having waste outlet hole locations that are not disposed directly beneath the drain hole 130 of the shower pan 100. For example, in the case where the waste outlet hole is disposed on the installation subfloor but not in direct alignment with the drain hole 130, an offset drain assembly may be used in the accommodation space 180 to effectively connect the drain hole 130 and the waste outlet hole without additional renovation.

Further, if the waste outlet hole is not disposed on the installation subfloor but instead is disposed at, for example, a bathroom wall of the installation site, a side/elbow outlet drain assembly, which connects the drain hole 130 and the waste outlet hole at a 90 degree angle via the front end opening 181, may be applied in the accommodation space 180. The dimensions of the front end opening 181 should be sufficient to accommodate the side outlet drain assembly, preferably a width of about 5 inches and a height of about 3-4 inches.

The height of the accommodation space 180, which is measured from the installation floor to the bottom of the drain hole, is at least 2 inches when measured from the installation floor but not more than 6 inches, preferably 3-4 inches, and most preferably about 3 inches. In particular, the height of the accommodation space 180 is about half of the height of the front end wall of the shower pan. As mentioned above, the width of the accommodation space is at least 7 inches such that it is capable of comfortably and flexibly accommodating drain assemblies of various configurations and dimensions.

The accommodation space 180 of the present disclosure is able to accommodate drain assemblies of varying configuration and dimensions which are commercially available. As described above, the drain assembly may be a straight drain in which the inlet and the outlet of the drain assembly are coaxial and completely or closely aligned to each other, an offset drain in which the inlet and the outlet are substantially parallel but not coaxial with each other, or a side/elbow outlet drain in which the axis of the inlet and the axis of the outlet disposed at an angle, e.g., 90 degrees. Additionally, during installation, the drain assembly may, when necessary, connect to the drain hole and/or the waste outlet hole via one or more additional piece, such as a section of PVC pipe or a flexible hose or a fitting.

Thus, unlike conventional prefabricated shower pans which, when installed, have the drain hole extending to or very close to the installation subfloor, the shower pan of the present disclosure provides an accommodation space 180 between the drain hole 130 and the installation floor, thereby enabling flexible plumbing solutions to be applied at the installation site.

In another embodiment of the present disclosure, a second accommodation space (not shown) is provided in the shower pan 100. The second accommodation space is spaced apart from the accommodation space 180 and is disposed underneath a portion of the floor 120, which is near the waste outlet hole when installed. The second accommodation space may have substantially similar dimensions as the accommodation space 180 described above, and may extend to a side wall opening (not shown) of the side wall of the shower pan 100 adjacent to the waste outlet hole. A pipe pathway (not shown) which communicates with the accommodation space 180 and the second accommodation space is disposed through the plurality of support structures 170. The pipe pathway is configured to accommodate pipes that extend from the accommodation space 180 to the second accommodation space, and may have a diameter of 1-3 inches, preferably about 2 inches. The support structures 170 through which the pipe pathway travels may have an arch shape to accommodate and/or fix the pipes and to help maintain the structural integrity of the shower pan 100.

The second accommodation space is configured to accommodate a second drain assembly connecting the pipe to the waste outlet hole. Thus, if the waste outlet hole is disposed at a location further away from the drain hole 130 and the accommodation space 180 of the shower pan, the drain hole 130 can be connected to the waste outlet hole via the drain assembly accommodated in the accommodation space 180, the pipe routed through the pipe pathway, the second drain assembly accommodated in the second accommodation space, and the side wall opening. In other words, the accommodation space 180, the pipe pathway, and the second accommodation space define a connection pathway between the drain hole 130 and the waste outlet hole. Here, the side wall opening has substantially similar dimensions to the front end opening 181 described above.

In still another embodiment, the accommodation space may not abut a side wall of the shower pan 100. Instead, the accommodation space may be disposed amongst and be defined by the supporting structures 170. The size and shape of such accommodation space may be the same or substantially similar to the accommodation space 180 described above with respect to the embodiment of FIG. 1 while its location differs.

While the present disclosure has been described in connection with certain exemplary embodiments, it is to be understood that the disclosure is not limited to the disclosed embodiments, but is instead intended to cover various modifications and equivalent arrangements included within the spirit and scope of the appended claims, and equivalents thereof.

As described above, optimum embodiments have been shown and described in the drawings and the specification. The particular terms used herein are merely intended to describe the present disclosure and are not used to limit the meanings or restrict the scope of the present disclosure disclosed in the claims. Therefore, it should be understood by one of ordinary skill in the art that a variety of modifications and equivalents thereof may be made. Accordingly, the technical scope of the present disclosure should be determined by the technical concept of the following claims.

The invention claimed is:

1. A prefabricated shower pan for installation on an installation site having a waste outlet hole, the prefabricated shower pan comprising:
   a drain hole extending through a shower pan floor and configured to communicate with the waste outlet hole at the installation site via a drain assembly;
   the shower pan floor having a flat slanted upper surface;
   one or more side walls, each surrounding and supporting a portion of a circumference of the shower pan floor;
   an accommodation space disposed below the drain hole and configured to accommodate the drain assembly for connecting the drain hole and the waste outlet hole; and
   a plurality of support structures attached to a lower surface of the shower pan floor and the one or more side walls, and each of the plurality of support structures extends to an installation subfloor when the shower pan is installed on the installation subfloor,
   wherein the drain assembly is one selected from a straight drain, an offset drain, and a side/elbow outlet drain, and the accommodation space is a continuous space enclosed by the shower pan floor, the subfloor at the installation site, and at least one of the one or more side walls, and
   wherein a height of the accommodation space, measured from the installation floor to the bottom of the drain hole, is at least 2 inches but not more than 6 inches and a width of the accommodation space is at least 7 inches.

2. The shower pan of claim 1, wherein the plurality of support structures form a grid of interconnected supports.

3. The shower pan of claim 2, wherein the accommodation space is defined by the plurality of support structures, the shower pan floor, and at least one side wall.

4. The shower pan of claim 3, wherein a ratio of a width of the shower pan and the width of the accommodation space is 4:1.

5. The shower pan of claim 2, wherein the accommodation space is surrounded by the plurality of support structures and the shower pan floor.

6. The shower pan of claim 1, wherein the one or more side walls has a height of at least 6 inches, the drain hole has a height of at least 3 inches.

7. The shower pan of claim 1, wherein the shower pan floor comprises a water receiving step defining a water receiving area disposed around the drain hole, the water receiving area configured to receive water from the shower pan floor, and
   wherein a height of the water receiving area is lower than a height of the shower pan floor and the water receiving area has a slanted surface towards the drain hole.

8. The shower pan of claim 7, wherein a height of the one or more side walls is greater than the height of the shower pan floor, and the height of the water receiving area is higher than a height of the drain hole.

9. The shower pan of claim 1, wherein at least one of the one or more side walls has an opening configured to accommodate a passage of a connecting member to pass through the opening.

10. The shower pan of claim 9, wherein more than one of the one or more side walls has an opening, each opening is configured to accommodate a passage of the connecting member to pass through each opening.

11. A shower pan installation kit comprising:
    the shower pan of claim 1; and
    a shower pan drain assembly.

12. The shower pan installation kit of claim 11, wherein the shower pan drain assembly is one selected from a straight drain, an offset drain, and a side/elbow outlet drain.

13. The shower pan of claim 7, wherein the water receiving area in the shower floor pan defines an upper ceiling of the accommodation space and the plurality of support structures and an front end wall amongst the one or more side walls defines a circumference of the accommodation space.

* * * * *